Feb. 20, 1940.                    S. OPREAN                    2,191,352
                        FROZEN CONFECTION AND COATING
                          Original Filed Jan. 19, 1937
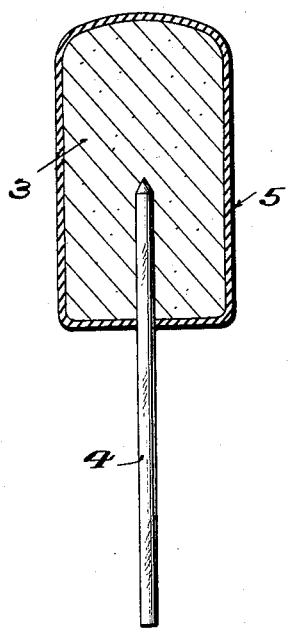
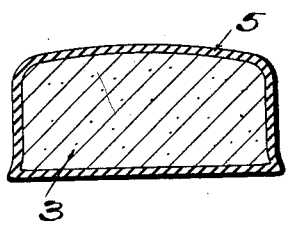
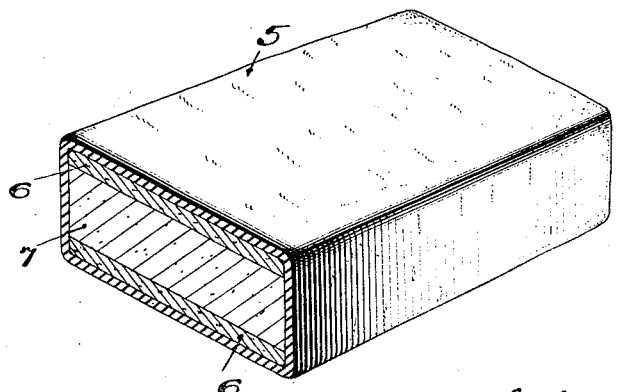
Inventor
Sabin Oprean
By Cameron, Kerkam & Sutton
Attorneys Patented Feb. 20, 1940

2,191,352

UNITED STATES PATENT OFFICE 2,191,352

FROZEN CONFECTION AND COATING

Sabin Oprean, New York, N. Y., assignor to Julia Oprean, New York, N. Y.

Application January 19, 1937, Serial No. 121,311
Renewed July 20, 1939

22 Claims. (Cl. 99—134)

This invention relates to food products, particularly to confectionery coatings, and their method of manufacture, and to coated confections of the kind having a core or center of ice cream, water ice, milk sherbet or the like, and is a continuation in part of my application Serial No. 655,492, filed February 6, 1933.

Confections of this character now on the market are roughly divisible into two types; those having a core coated with a layer of a granular material, such as candy, nuts, cereal or coconut, and those having a core encased in a form retaining shell of a comparatively hard substance such as chocolate. The present invention is applicable to both types with considerable advantage, but it is in connection with the latter that the attendant benefits are especially outstanding.

Up to the present time, confections of this latter type have been restricted almost entirely to the use of chocolate for the coating, it being about the only material available considered to have the necessary sustaining qualities combined with palatability. Although the sale of them has been extensive, they therefore have not come into as wide use as might be expected because of the limited appeal of a chocolate flavor to the public taste. Furthermore, such use as has been made of chocolate has not been without recognition of the fact that it possesses certain other very definite and important disadvantages. Chocolate coatings are fragile and brittle, particularly when cold, and being of an oily or fatty nature have no adhesive affinity for the water which goes to make up the body of the core, if it be water ice, or the continuous phase of the emulsion forming the core, if it be ice cream or milk sherbet. Consequently, when the confection is bitten into, the coating cracks or flakes off over a large area, leaving the core free to leak out on softening and soil the face, hands and clothing of the person eating it.

It accordingly is one of the objects of the present invention to provide a novel confection comprising a frozen core or center enclosed within a non-brittle coating intimately bonded to the core.

Another object is to provide an improved confectionery coating which is homogeneous and stable in composition, and capable of production in a wide range of flavors and colors.

A further object is to provide an edible coating for frozen confections which is flexible and tender to the touch or bite, flavored and colored to taste, and capable of bonding to the core which it surrounds.

Still another object is to provide a method of manufacturing a homogeneous, stable, emulsified coating for confections which is capable of production in a wide variety of flavors and colors.

A still further object is to provide a new food product having a body portion or core of any suitable frozen confection and a coating comprising a substantially homogeneous, stable emulsion having a relatively stiff, jelly-like consistency at temperatures, at which the core remains frozen.

Another object is to provide a novel confection consisting of a substantially solid or frozen core to which is intimately bonded a coating of an edible gelatinous substance, elastic at temperatures at which the core remains frozen and flavored and colored to taste.

Another object is to provide a frozen confection comprising a body portion or core of ice cream or the like and a surrounding flexible, flavored coating containing an edible glyceride.

These and other objects will appear more fully from a consideration of the detailed description of the invention which follows. Although the accompanying drawing illustrates several forms of confection which the present invention may be embodied, it will be understood that this drawing is solely for the purpose of exemplification, and is not to be construed as defining the scope of the invention, reference being had for this latter purpose to the appended claims.

In the drawing:

Fig. 1 is a longitudinal sectional view of one form of frozen confection embodying the present invention.

Fig. 2 is a sectional view of another form of frozen confection embodying the invention.

Fig. 3 is a perspective view, partially broken away, of still another form of confection in which the invention may be embodied.

In applying the present invention to a frozen confection, a core or body portion 3 of ice cream, water ice, milk sherbet or the like, is first frozen in any suitable manner, either with a handle 4, as in Fig. 1, or without it, as in Fig. 2. The coating 5, which constitutes the salient feature of the present invention, may then be applied by dipping the frozen mass into a supply of the coating in liquid state, in a manner similar to that hitherto practiced in coating ice cream with chocolate. The coating 5 which is thus applied to the core 3 is preferably of an edible substance which is substantially non-brittle on cooling and possesses sufficient firmness to retain the shape of the core. The coating is also characterized by the fact that when it has solidified it is not only intimately bonded to the core, but is also flexible and tender, so that it may be readily bitten into and does not crack or flake off in the manner characteristic of the coatings hitherto known. It also is desirable that the coating be capable of being flavored and colored in any desired manner.

One of the substances which has been found to possess the desired characteristics for coating confections of this character is gelatin. It has been discovered that a solution of gelatin will bond with frozen masses such as ice cream and the like, and on setting will be flexible or elastic without being viscid. It also lends itself readily to flavoring and coloring. Another advantage incident to the use of gelatin for such a coating is that it may be readily obtained commercially with the flavoring and coloring matter already incorporated therein, and may be easily prepared in liquid form by simply adding water. For example, the commercial gelatin dessert powder known as "Jell-O" has proven quite satisfactory for use in connection with this embodiment of the present invention, because it contains certain amounts of sugar and other substances which impart a shortness or tenderness to the coating not possessed by plain gelatin, and expedite its setting.

In preparing a gelatin coating, the powdered gelatin, preferably already flavored and colored, may be mixed with water in suitable proportions, and the liquid mixture brought to a proper temperature for dipping. For example, equal parts of flavored and colored gelatin, such as Jell-O, may be mixed with equal parts of warm water, by weight, to effect solution, and the mixture then brought to approximately 60–80° F. In the event that unflavored, uncolored gelatin in used, a suitable amount of flavoring and coloring materials may be added to the mixture. The gelatin solution may then be applied to the cores of ice cream, or the like, in any suitable manner, as by dipping and then chilling in the manner heretofore practiced when coating ice cream with chocolate. On cooling and solidifying the gelatin coating becomes bonded to the frozen core and forms a sheath, therefor, which is flexible and yet possessive of sufficient firmness to retain the shape of the core.

To avoid lumpiness, it may be found desirable on occasion to replace a portion of the water with a suitable vegetable fat, such as cocoa butter. For example, it has been found that proportions of cocoa butter up to as much as 50% of the total solution may be incorporated, thereby imparting a very smooth consistency to the coating. Various other vegetable fats, such as peanut butter, or even certain animal fats, may also be employed for this purpose, if that is deemed suitable or desirable.

A particularly satisfactory coating possessing the desired characteristics consists of a mixture of roughly equal parts of water, sugar syrup and an edible glyceride, and relatively small amounts of gelatin, acid, flavoring and coloring material. For example, a mixture of the following ingredients in the approximate proportions set forth has been found to produce a stable emulsion capable of forming a tender, flexible, homogeneous coating when applied to a frozen or solid confectionery core:

|  | Per cent |
|---|---|
| Water | 30.00 |
| Coconut oil (refined) | 26.00 |
| Sugar syrup (66½° Baumé) | 38.00 |
| Gelatin | 4.00 |
| Acid (tartaric) | .60 |
| Flavor and color | 1.40 |
|  | 100.00 |

It will be understood, of course, that the above proportions may be varied considerably to produce a coating of the exact characteristics desired, and may be changed to take care of any limitations of the particular core to which the coating is to be applied. Various other edible glycerides such as butter, cottonseed oil, sesame oil, corn oil, or other vegetable fats or oils can be substituted for the coconut oil above specified, and the same may be done in the case of the acid, so long as the particular acid chosen is not deleterious to health. Also various other edible gelable materials such as agar-agar, gum arabic, or other gums, Irish moss, can be substituted for the gelatin above specified. Furthermore, this coating may be given a pronounced chocolate flavor by substituting for a portion of the coconut oil, or other edible glyceride, chocolate liquor of the kind commonly used in the art. Thus, for a mild flavor, chocolate liquor in the amount of about 10% of the total mixture may be substituted, while if a more pronounced chocolate flavor is desired, this proportion may be increased to 15% or 20% or more. A typical mixture may be made up as follows, it being understood, of course, that when chocolate is used other flavoring and coloring matter preferably is omitted.

|  | Per cent |
|---|---|
| Water | 31.00 |
| Coconut oil (refined) | 10.00 |
| Sugar syrup (66½° Baumé) | 38.00 |
| Chocolate liquor | 17.00 |
| Gelatin | 4.00 |
|  | 100.00 |

In preparing the emulsified type of coating, the sugar syrup and gelatin are mixed with stirring in a suitable kettle, and the water added. This mixture is heated and stirred to dissolve the gelatin, and then the melted coconut oil is stirred in and the whole thoroughly beaten to emulsify it. Thereafter the acid is added, and the mixture colored and flavored to taste. The acid assists in bringing about a rapid setting of the coating and is necessary for the best development of most of the fruit flavors. The preparation of a chocolate flavored coating is carried out in the same manner, except that chocolate liquor is substituted for part of the oil and the acid is omitted. The finished mixture is then ready, and upon being brought to a temperature of about 70°–110° F. can be applied to the cores in any suitable manner without difficulty. When it has cooled or set, the coating will be found to have a smoothness and tenderness not unlike that of a fine custard or jelly, and yet to be so firmly and flexibly bonded to the core as to preclude its cracking or flaking off when bitten into.

Typical mixtures in which edible gelable materials other than gelatin are used, may be made up as follows:

|  | Per cent |
|---|---|
| Water | 31.00 |
| Coconut oil (refined) | 10.00 |
| Sugar syrup (66½° Baumé) | 39.00 |
| Chocolate liquor | 18.00 |
| Agar-Agar | 2.00 |
|  | 100.00 |

Another mixture found suitable is:

|  | Per cent |
|---|---|
| Water | 31.00 |
| Coconut oil (refined) | 27.00 |
| Sugar syrup (66½° Baumé) | 38.00 |
| Agar-Agar | 2.00 |
| Acid (tartaric) | .60 |
| Flavor and color | 1.40 |
|  | 100.00 |

Still another mixture is as follows:

|  | Per cent |
|---|---|
| Water | 31.00 |
| Coconut oil (refined) | 10.00 |
| Sugar syrup (66½° Baumé) | 36.00 |
| Chocolate liquor | 18.00 |
| Irish moss | 3.00 |
| Gum arabic | 2.00 |
|  | 100.00 |

And a mixture with flavor and color other than chocolate, in which gum arabic and Irish moss are used may be made as follows:

|  | Per cent |
|---|---|
| Water | 30.00 |
| Coconut oil (refined) | 26.00 |
| Sugar syrup (66½° Baumé) | 37.00 |
| Acid (tartaric) | .60 |
| Flavor and color | 1.40 |
| Irish moss | 3.00 |
| Gum arabic | 2.00 |
|  | 100.00 |

As stated above, it will be understood that the proportions in the above formulae may be varied considerably to produce a coating or confectionery filler of the exact characteristics desired.

Although in the preceding paragraphs, the novel coatings provided by the present invention have been described with particular reference to confections having cores composed entirely of a frozen substance, it will be understood that they also may be utilized in combination with pastry or bakery products in the preparation of articles of somewhat different nature. For example, as shown in Fig. 3, any of the various coatings above described may be applied so as to completely surround a sandwich consisting of wafers 6 and a filling 7 of any suitable material such as ice cream or the like. Being firm and flexible and not sticky to the touch, the coating enables the product to be held in the fingers without danger of soiling, and prevents crumbling or displacement of the wafers during eating. Or any of the various formulae above described may be used for a pie filler, in which case it may be desirable to add a small amount of flour for thickening.

The present invention thus provides both a novel confectionery coating and an improved type of confection markedly superior to any now on the market. The coating, in all its various forms, is stable, homogeneous, tender and flexible, and capable of being made in a wide variety of flavors and colors to meet the public taste. Having water as a base, it will "wet" cores composed of ice cream, water ice, milk sherbet or the like, and form a firm bond therewith the like of which is not obtained by chocolate or any of the other materials commonly used for the same purpose. The confection embodying it, as herein provided, accordingly is delicious in taste, easy to eat and entirely devoid of any danger of the coating cracking and flaking off when bitten into.

Although certain forms of confections have been shown in the drawing it will be understood that the present invention is not limited to such forms but is applicable to any kind of confection in which a confectionery material of the character herein disclosed may be suitably embodied. It also will be appreciated that the several formulas for coatings herein given are merely for purposes of illustration, the exact composition of the coatings and the proportions of the ingredients being factors which may be varied within reasonable limits without departing from the spirit and scope of the invention as defined by the appended claims. In this connection, applicant is not unmindful of the fact that the prior art contains incidental disclosures of the dipping of a frozen core in edible gelatin. The United States patents to Burt, Nos. 1,470,524; 1,470,525; and 1,718,997, mention the possibility of coating ice cream with a film of gelatin to serve as an adhesive for holding a layer of granular material in place, and the German patent to Tobien, No. 274,709, obliquely refers to the use of gelatin as a coating for liqueur confections. Neither disclosure, however, concerns or suggests a coating or confection having the novel qualities and advantages characterizing the present invention.

I claim:

1. A food product comprising a core of frozen confection enclosed in a sheath containing a substantially stable jellied emulsion of an edible oil in an aqueous gelatin solution.

2. A food product comprising a core of frozen confection enclosed in an emulsified jellied coating containing gelatin and an edible oil.

3. A food product comprising a core of frozen confection encased in a flavored and colored flexible coating containing an emulsion of edible oil and a gelled aqueous gelatine solution.

4. A food product comprising a core, composed at least partially of a frozen confection, enclosed in a coating comprising a substantially homogeneous sweetened oil-in-water emulsion having a relatively stiff, jelly-like consistency, and containing gelatine.

5. A frozen confection comprising a core of ice cream enclosed in a coating consisting of a jellied oil-in-water emulsion containing gelatin.

6. A frozen confection comprising a core of ice cream, water ice, or milk sherbet, enclosed in a coating comprising a substantially stable jellied emulsion of water, sugar, gelatine, and an edible oil.

7. A frozen confection comprising a core of ice cream enclosed in a coating consisting of a substantially stable jellied emulsion containing water, sugar, an edible oil and relatively small amounts of gelatine, flavoring and coloring matter.

8. A coating for confections comprising a flavored and colored jellied emulsion containing gelatin and at least 10% of an edible oil.

9. A confectionery material comprising a flavored and colored emulsion of water, sugar, gelatine and coconut oil adapted to set on cooling to a tender, flexible body of relatively stiff, jelly-like consistency.

10. The method of making a confection which comprises the steps of forming a liquid mixture containing water, gelatine and an edible oil, emulsifying the mixture thus formed, heating the emulsion to a temperature not exceeding about 110° F., and then applying the heated emulsion as a coating to a core of frozen confection to form a flexible jellied coating.

11. A food product comprising a core of frozen confection having a coating comprising a gelled aqueous solution of gelatine, having emulsified therein an edible fat.

12. A food product comprising a core of frozen confection having a coating comprising a gelled aqueous sugar solution of gelatine, having emulsified therein an edible fat.

13. A food product comprising a core of frozen confection enclosed in a sheath containing a substantially stable jellied emulsion of an edible oil in an aqueous solution of edible gellable material.

14. A food product comprising a core of frozen confection encased in a flavored and colored flexible coating containing an emulsion of edible oil and a jelled aqueous solution.

15. A food product comprising a core, composed at least partially of a frozen confection, enclosed in a coating comprising a substantially homogeneous sweetened jellied oil-in-water emulsion having a viscous jelly-like consistency at normal temperatures and being gelable at relatively low temperatures.

16. A food product comprising a core of frozen confection having a coating comprising a jelled aqueous solution of a gelable organic edible emulsifying agent having emulsified therein an edible fat.

17. A food product comprising a core of frozen confection having a coating comprising a jelled aqueous solution of a gelable organic edible emulsifying agent having emulsified therein an edible oil.

18. A frozen confection comprising a core of ice cream enclosed in a coating consisting of a jellied oil-in-water emulsion containing an edible organic gelable material.

19. A confectionery material comprising a flavored and colored emulsion of water, sugar, edible gelable material and coconut oil adapted to set on cooling to a tender flexible body of relatively stiff, jelly-like consistency.

20. The method of making a confection which comprises the steps of forming a liquid mixture of water, an edible gelable material and an edible oil, emulsifying the mixture thus formed, heating the emulsion to a temperature not exceeding about 110° F. and then applying the heated emulsion as a coating to a core of frozen confection to form a flexible jellied coating.

21. A confectionery material comprising flavored and colored emulsion of water, sugar, edible gelable material and an edible fat, adapted to set on cooling to a tender flexible body of relatively stiff jelly-like consistency.

22. A confection comprising a substantially homogeneous sweetened jellied oil-in-water emulsion having a viscous jelly-like consistency at normal temperatures and being gelable at relatively low temperatures.

SABIN OPREAN.